US005536779A

United States Patent [19]
Wendel et al.

[11] Patent Number: 5,536,779
[45] Date of Patent: Jul. 16, 1996

[54] AQUEOUS POLYMER DISPERSIONS

[75] Inventors: Kurt Wendel, Ludwigshafen; Thomas Schwerzel, Meckenheim; Guenter Hirsch, Mutterstadt, all of Germany

[73] Assignee: BASF Aktiengesellschaft, Ludwigshafen, Germany

[21] Appl. No.: 287,260

[22] Filed: Aug. 8, 1994

Related U.S. Application Data

[62] Division of Ser. No. 957,170, Oct. 7, 1992, Pat. No. 5,358,998.

[30] Foreign Application Priority Data

Oct. 7, 1991 [DE] Germany .................. 41 33 193.1

[51] Int. Cl.⁶ ................................................ C08F 16/06
[52] U.S. Cl. ................. 525/54.26; 525/55; 524/47; 524/52; 524/53; 524/502; 524/457; 524/734; 526/238.22
[58] Field of Search ................. 524/47, 52, 53, 524/734, 457, 502; 526/238.22; 525/55, 54.26

[56] References Cited

U.S. PATENT DOCUMENTS

| | | | |
|---|---|---|---|
| 4,532,295 | 7/1985 | Brabetz et al. ............. 524/734 X |
| 4,560,724 | 12/1985 | Brabetz et al. ............. 524/734 |
| 4,835,212 | 5/1989 | Degan et al. ............... 524/734 |
| 4,855,343 | 8/1989 | Degen et al. ............... 524/734 X |
| 5,004,767 | 4/1991 | Krause et al. .............. 524/734 X |
| 5,055,504 | 10/1991 | Mahil et al. ............... 524/734 X |
| 5,061,556 | 10/1991 | Dotzauer et al. . |
| 5,082,882 | 1/1992 | Pettijohn ................. 524/734 X |
| 5,147,907 | 9/1992 | Rinck et al. ............... 524/734 X |
| 5,221,296 | 6/1993 | Schwerzel et al. . |
| 5,290,832 | 3/1994 | Schwerzel et al. . |
| 5,326,586 | 6/1994 | Grabowski et al. . |

FOREIGN PATENT DOCUMENTS

| | | | |
|---|---|---|---|
| 0695876 | 10/1964 | Canada ................. 524/734 |
| 0021542 | 1/1980 | European Pat. Off. ......... 524/734 |
| 0223145 | 5/1987 | European Pat. Off. ......... 524/734 |
| 3323804 | 1/1985 | Germany ................ 524/734 |
| 3323851 | 1/1985 | Germany ................ 524/734 |
| 0128988 | 12/1974 | Japan .................. 524/734 |
| 0061161 | 4/1983 | Japan .................. 524/734 |
| 0087105 | 5/1983 | Japan .................. 524/734 |
| 0703005 | 1/1954 | United Kingdom ........... 524/734 |

Primary Examiner—Judy M. Reddick
Attorney, Agent, or Firm—Oblon, Spivak, McClelland, Maier & Neustadt

[57] ABSTRACT

A polymer powder obtained by drying an aqueous polymer dispersion, wherein the aqueous polymer dispersion is obtained by free-radical polymerization of unsaturated monomers and contains at least one added starch-degradation product which is obtained by hydrolysis in the aqueous phase, is water soluble at room temperature and has a weight average molecular weight $M_w$ of from 2500 to 25000.

23 Claims, No Drawings

AQUEOUS POLYMER DISPERSIONS

This is a division of application Ser. No. 07/957,170, filed on Oct. 7, 1992 now U.S. Pat. No. 5,358,998.

The present invention relates to aqueous polymer dispersions of polymers obtainable by free-radical polymerization of unsaturated monomers which contain at least one added starch-degradation product which is obtainable by hydrolysis in the aqueous phase and has a weight average molecular weight $M_w$ of from 2500 to 25000. The present invention furthermore relates to a process for the preparation of aqueous polymer dispersions of this type and to the use of these dispersions.

Aqueous polymer dispersions are systems which contain, as the disperse phase, polymer particles dispersed in an aqueous dispersion medium. Since the dispersed polymer particles tend to agglomerate for reasons of thermodynamic stability, aqueous polymer dispersions are generally stabilized using surfactants.

Such surfactants which have been recommended include starches and starch derivatives, which, compared with other surfactants, are advantageous inasmuch as they are renewable raw materials. The use of non-degraded starches or derivatives of non-degraded starches which imply no degradation is disadvantageous compared with the use of degraded starches or derivatives thereof inasmuch as the first-mentioned are not entirely satisfactory with respect to their solubility in water and with respect to their rheological behavior in aqueous media.

DE-A 3 922 784 relates to a process for the preparation of aqueous polymer dispersions by free-radical polymerization of unsaturated monomers in the presence of unmodified or chemically modified dextrins, where the polymers must contain at least 20% by weight of a diene, and the proportion by weight of dextrins having a molecular weight of greater than 5000 is at least 50% by weight and the proportion by weight of dextrins having a molecular weight of greater than 100,000 is at most 5% by weight. For the purposes of this invention, dextrins are degraded starches whose degradation is effected by heating with or without addition of chemicals, it being possible to recombine degradation fragments under the degradation conditions to form new bonds which were not present in this form in the original starch. Since the term dextrin is sometimes also used as a general term for all high-molecular-weight fragments of starches, the term roast dextrins, which is conventional in the specialist literature (see, for example, Günther Tegge, Stärke und Stärkederivate, Behr's Verlag, Hamburg 1984, p. 173), will be used here for the dextrins of DE-A 3 922 784. Roast dextrins are prepared by heating moist-dry starch, usually in the presence of small amounts of acid. The most important reaction during the roasting is limited hydrolytic degradation of the starch, which, due to the spatial density, is accompanied by recombination and branching reactions.

Examples of typical roast dextrins are the commercially available white and yellow dextrins, and furthermore dextrins marketed under the trade names Noredux® and Tackidex® (Günther Tegge, Stärke und Stärke-derivate, Behr's Verlag, Hamburg 1984, p. 173–177).

The process of DE-A 3 922 784 has the disadvantage that on the one hand it is restricted to certain monomers and on the other hand uses roast dextrins which must be prepared by the roasting process, which is relatively complex, in particular with respect to the necessary reactors.

EP-A 334 515 relates to aqueous dispersions of polyacrylates which are obtainable by the free-radical polymerization of the monomers in the presence of a dextrin of which at least 70% has a molecular weight in the range from 1000 to 25000 and not more than 10% has a molecular weight above 25000. These aqueous dispersions have the disadvantage that the dextrins which must be used according to EP-A 334 515 are again roast dextrins which are only obtainable by a relatively complex process and which even then do not give aqueous polymer dispersions which are long-term stable with respect to their dynamic viscosity if the roast dextrins are employed in pregelled form. Thus, the dynamic viscosity doubles within 5 days after preparation in the most favorable working example.

DE-A 3 323 804 relates to aqueous polymer dispersions which are obtainable, inter alia, by free-radical aqueous emulsion polymerization in the presence of "starches degraded by acid hydrolysis and frequently also known as dextrins" and are particularly suitable for the preparation of polymer powders. The preparation of the dextrins by acid hydrolysis is not described in greater detail in this publication since it is alleged to be known to a person skilled in the art. However, the working examples indicate that DE-A 3 323 804 also relates to roast dextrins having said disadvantageous properties. For example, the dextrins employed included yellow and white dextrins.

EP-A 276 770 discloses aqueous polymer dispersions obtainable by polymerization of certain unsaturated monomers in the presence of degraded starches, where the starches are characterized by their intrinsic viscosity. These polymer dispersions have the disadvantage that the identity of the degraded starches used as examples is completely open and the viscosity is a rather undefined measure for their characterization, as shown in EP-A 334 515.

It is an object of the present invention to provide aqueous polymer dispersions of polymers obtainable by free-radical polymerization of unsaturated monomers, whose disperse distribution is stabilized, compared with the prior art, with the aid of readily accessible degraded starches and which simultaneously, in an entirely satisfactory manner, a) are obtainable in a simple manner, b) have increased stability under mechanical or thermal load, c) have increased stability toward addition of electrolyte, d) are not restricted to polymers of specific monomers, e) have increased flowability, f) have a flowability which remains essentially unchanged, even over long periods, g) are low-foaming, h) can be obtained with a mean particle diameter which is variable over a broad range, i) have a reduced content of microflocculations (specks) and macroflocculations (coagulate), j) do not discolor on extended storage, k) are suitable for the preparation of redispersible powders l) do not undergo any phase separation even on extended storage.

We have found that this object is achieved by the aqueous polymer dispersions defined at the outset. Starch degradation products having a weight average molecular weight of from 2500 to 25000 and obtainable by hydrolysis in the aqueous phase are usually known as sugared starches, in contrast to roast dextrins, and are commercially available as such (for example the C* PUR Products 01906, 01908, 01910, 01912, 01915, 01921, 01924, 01932 and 01934 from Cerestar Deutschland GmbH, D-1150 Krefeld 12).

Sugared starches of this type differ chemically from roast dextrins through the fact, inter alia, that recombination and branching are essentially impossible, evident not least in different molecular weight distributions, on hydrolytic degradation in an aqueous medium (usually suspensions or solutions), which is generally carried out at solids contents of from 10 to 30% by weight and preferably with acid or enzyme catalysis. Thus, sugared starches which have a bimodal molecular weight distribution have proven particularly advantageous according to the invention.

The preparation of sugared starches is generally known and is described, inter alia, in Günther Tegge, Stärke und Stärkederivate, Behr's Verlag, Hamburg 1984, p. 173 and p. 220 ff. and in EP-A 441 197. The sugared starches to be used according to the invention are preferably those whose weight average molecular weight $M_w$ is in the range from 4000 to 16000, particularly preferably in the range from 6500 to 13000.

The sugared starches to be used according to the invention are normally completely soluble in water at room temperature, the solubility limit generally being above 50% by weight, which proves particularly advantageous for the preparation of the aqueous polymer dispersions according to the invention.

It has furthermore proven favorable for the sugared starches to be used according to the invention to have a nonuniformity U (defined as the ratio between the weight average weight $M_w$ and the number average molecular weight $M_n$; U characterizes the molecular weight distribution) in the range from 6 to 12. U is particularly advantageously from 7 to 11 and very particularly advantageously from 8 to 10.

It is furthermore advantageous for the proportion by weight of the sugared starches having a molecular weight of below 1000 to be used according to the invention to be at least 10% by weight, but not more than 70% by weight. This proportion by weight is particularly preferably in the range from 20 to 40% by weight.

It is furthermore advisable to use sugared starches to be used according to the invention whose dextrose equivalent DE is from 5 to 40, preferably from 10 to 30, particularly preferably from 10 to 20. The DE value characterizes the reduction capacity, relative to the reduction capacity of anhydrous dextrose, and is determined in accordance with DIN 10308, Edition 5.71, produced by the German Standards Committee on Foodstuffs and Agricultural Products (cf. also Günther Tegge, Stärke und Stärkederivate, Behr's Verlag, Hamburg 1984, p. 305).

It has also been found that aqueous polymer dispersions which have a particularly favorable property profile are obtained if sugared starches to be used according to the invention whose 40% strength by weight aqueous solutions have a dynamic viscosity $\eta^{30}$ [Pa.s], determined in accordance with DIN 53 019 at 25° C. and a shear gradient of 75 $s^{-1}$, of from 0.01 to 0.06, preferably from 0.015 to 0.04, particularly preferably from 0.02 to 0.035.

It should be noted at this point that molecular weight data for sugared starches to be used according to the invention are based in this publication, unless expressly stated otherwise, on determinations by means of gel permeation chromatography, carried out under the following conditions:

Columns: 3 steel units measuring 7.5×600 mm, filled with TSK gel G 2000 PW; G 3000 PW and G 4000 PW. Mesh 5 µm Eluent: Distilled water.

Temp.: RT (room temperature)

Detection: Differential refractometer (for example ERC 75 11)

Flow rate: 0.8 ml/min, pump (for example ERC 64.00)

Injection vol.: 20 µl, valve (for example VICI 6-way valve)

Evaluation: Bruker Chromstar GPC software

Calibration: The calibration was carried out in the low-molecular-weight range using glucose, raffinose, maltose and maltopentose. For the higher-molecular-weight range, pullulan standard having a polydispersity <1.2 was used.

The starting starches for the preparation of the sugared starches to be used according to the invention can in principle be any native starches, such as cereal starches (eg. corn, wheat, rice or barley), tuber and root starches (eg. potatoes, tapioca roots or arrowroot) or sago starches.

An essential advantage of the sugared starches to be used according to the invention is that they can be used without any further chemical modification, apart from the extremely simple partial hydrolysis of the starting starch for their preparation. However, it is of course also possible to use them according to the invention in chemically modified form, for example by etherification or esterification. This chemical modification may also have been carried out in advance on the starting starch before its degradation. Esterifications are possible using both inorganic and organic acids, or anhydrides or chlorides thereof. Phosphated and acetylated degraded starches are of particular interest. The most common method of etherification is treatment with organohalogen compounds, epoxides or sulfates in aqueous alkaline solution. Particularly suitable ethers are alkyl ethers, hydroxyalkyl ethers, carboxyalkyl ethers and allylethers. It is also possible to use products of the reaction with 2,3-epoxypropyltrimethylammoniumchloride. Chemically unmodified sugared starches are preferred.

Suitable monomers which can be polymerized by means of free radicals include, in particular, monoethylenically unsaturated monomers, such as olefins, eg. ethylene, vinylaromatic monomers, such as styrene, α-methylstyrene, o-chlorostyrene and vinyltoluenes, vinyl and vinylidene halides, such as vinyl chloride and vinylidene chloride, esters made from vinyl alcohol and monocarboxylic acids having 1 to 18 carbon atoms, such as vinyl acetate, vinyl propionate, vinyl n-butyrate, vinyl laurate and vinyl stearate, esters made from α,β-monoethylenically unsaturated mono- and dicarboxylic acids, preferably having 3 to 6 carbon atoms, such as, in particular, acrylic acid, methacrylic acid, maleic acid, fumaric acid and itaconic acid, with alkanols generally having from 1 to 12, preferably from 1 to 8, in particular from 1 to 4, carbon atoms, such as, in particular, ethyl, n-butyl, isobutyl and 2-ethylhexyl acrylates and methacrylates, dimethyl maleate and n-butyl maleate, nitriles of α,β-monoethylenically unsaturated carboxylic acids, such as acrylonitrile, and $C_{4-8}$ conjugated dienes, such as 1,3-butadiene and isoprene. Said monomers are essentially insoluble in the aqueous media and generally form the principal monomers, which normally make up a proportion of greater than 50% by weight, based on the total amount of monomers to be polymerized. Monomers which, when polymerized alone, usually give homopolymers of increased water solubility are normally only copolymerized as modifying monomers in amounts, based on the total amount of monomers to be polymerized, of less than 50% by weight, in general from 0.5 to 20% by weight, preferably from 1 to 10% by weight.

Examples of such monomers are α,β-monoethylenically unsaturated mono- and dicarboxylic acids having 3 to 6 carbon atoms, and amides thereof, eg. acrylic acid, methacrylic acid, maleic acid, fumaric acid, itaconic acid, acylamide and methacrylamide, furthermore vinylsulfonic acid and water-soluble salts thereof, and N-vinylpyrrolidone. Monomers which usually increase the internal strength of films formed by the aqueous polymer dispersion are generally likewise only copolymerized in minor amounts, usually from 0.5 to 10% by weight, based on the total amount of monomers to be polymerized. Such monomers normally contain an epoxide, hydroxyl, N-methylol or carbonyl group or at least two non-conjugated ethylenically unsaturated double bonds. Examples of this are N-alkylolamides of α,β-monoethylenically unsaturated carboxylic acids having 3 to 10 carbon atoms and esters thereof with alcohols having 1 to 4 carbon atoms, of which N-methylolacrylamide and N-methylolmethacrylamide are very particularly preferred, monomers containing two vinyl radicals, monomers containing two vinylidene radicals, and monomers containing two alkenyl radicals. Particularly suitable here are diesters of dihydric alcohols with α,β-monoethylenically unsaturated monocarboxylic acids, of which in turn acrylic acid and methacrylic acid are preferably employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate and methylenebisacrylamide. In addition to monomers containing unsaturated double bonds, it is also possible to copolymerize minor amounts, usually from 0.01 to 4% by weight, based on the monomers to be polymerized, of molecular weight regulators, such as tert-dodecyl mercaptan. Such substances are preferably added to the polymerization zone in a mixture with the monomers to be polymerized.

Preferred classes of aqueous polymer dispersions according to the invention are those whose polymers are obtainable by free-radical polymerization of monomer mixtures which comprise from 50 to 100% by weight of esters of acrylic and/or methacrylic acid with alkanols having 1 to 12 carbon atoms and/or styrene (class I) or from 70 to 100% by weight of styrene and/or butadiene (class II) or from 70 to 100% by weight of vinyl chloride and/or vinylidene chloride (class III), class I being particularly preferred and preferably covering the following monomer compositions:

90 to 99% by weight of esters and acrylic and/or methacrylic acid with alkanols having 1 to 8 carbon atoms and/or styrene, and 1 to 10% by weight of acrylic acid, methacrylic acid or a mixture thereof.

Of very particular interest are the following monomer compositions:

from 90 to 99% by weight of n-butyl acrylate and/or styrene, from 1 to 10% by weight of acrylic acid and/or methacrylic acid.

The sugared starches to be used according to the invention may be used either as the only dispersant or as a mixture with other surfactants. If they are the only dispersants employed, they are normally present in the aqueous monomer dispersion according to the invention in an amount of from 1 to 120% by weight, based on the amount of polymerized monomers.

Suitable secondary surfactants are in principle the protective colloids and emulsifiers otherwise usually employed as dispersants. A detailed description of suitable protective colloids is given in Houben-Weyl, Methoden der organischen Chemie, Volume XIV/1, Makromolekulare Stoffe, Georg-Thieme-Verlag, Stuttgart, 1961, pp. 411 to 420. Suitable secondary emulsifiers are anionic, cationic and nonionic emulsifiers. It is preferred for the secondary surfactants to be exclusively emulsifiers, whose relative molecular weights, in contrast to the protective colloids, are usually below 2000. It is of course necessary, if mixtures of surfactants are used, for the individual components to be compatible with one another, which can be checked in case of doubt by means of a few preliminary experiments. The secondary surfactants used are preferably anionic and nonionic emulsifiers. Examples of customary secondary emulsifiers are ethoxylated fatty alcohols (degree of ethoxylation from 3 to 50, $C_8$- to $C_{36}$-alkyl radical), ethoxylated mono-, di- and trialkylphenols (degree of ethoxylation from 3 to 50, $C_4$- to $C_9$-alkyl radicals), alkali metal salts of dialkylesters of sulfosuccinic acid and alkali metal and ammonium salts of alkyl sulfates ($C_8$- to $C_{12}$-alkyl radical), of ethoxylated alkanols (degree of ethoxylation from 4 to 30, $C_{12}$- to $C_{18}$-alkyl radical), of ethoxylated alkylphenols (degree of ethoxylation from 3 to 50, $C_4$- to $C_9$-alkyl radical), of alkylsulfonic acids ($C_{12}$- to $C_{18}$-alkyl radical) and of alkylarylsulfonic acids ($C_9$- to $C_{18}$-alkyl radical). Further suitable emulsifiers are given in Houben-Weyl, Methoden der organischen Chemie, Volume XIV/1, Makromolekulare Stoffe, Georg Thieme Verlag, Stuttgart, 1961, pages 192 to 208. If secondary surfactants are used (in general in amounts of up to 5% by weight, based on the amount of polymerized monomers), aqueous polymer dispersions according to the invention have also proven advantageous if the proportion of sugared starches to be used according to the invention is 0.01% by weight, based on the amount of polymerized monomers. A particularly advantageous factor, inter alia, is the entirely satisfactory biodegradability of the dispersants according to the invention, which is presumably attributable not least to the fact that essentially no repolymerization with formation of bonds different from those in the natural starting starch takes place during the starch degradation for their preparation.

The aqueous polymer dispersions according to the invention are preferably prepared by polymerizing the monomers by the free-radical aqueous emulsion polymerization process in the presence of the sugared starches to be used according to the invention. The emulsion polymerization temperature is generally from 30° to 95° C., preferably from 75° to 90° C. The polymerization medium may either comprise water alone or a mixture of water and water-miscible liquids, such as methanol. It is preferred to use water alone. The emulsion polymerization can be carried out either as a batch process or in the form of a feed process, including a step or gradient procedure. Preference is given to the feed process, in which part of the polymerization batch is heated to the polymerization temperature and partially polymerized, and the remainder of the polymerization batch is subsequently fed to the polymerization zone continuously, in steps or with superposition of a concentration gradient, usually via a plurality of spatially separate feed streams, of which one or more contain the monomers in pure or emulsified form, while maintaining the polymerization. In an applicationally advantageous manner, the initially introduced mixture and/or the monomer feed stream contains small amounts of emulsifiers, generally less than 0.5% by weight, based on the total amount of monomers to be polymerized, in order to reduce the surface tension of the dispersion medium and thus to simplify stirring in. The monomers are therefore frequently fed to the polymerization zone after pre-emulsification with these assistant emulsifiers. Due to the high water solubility of the sugared starches to be used according to the invention, the feed process can be designed in a particularly simple manner by initially introducing all of the sugared starch to be used in dissolved form in an aqueous mixture; pregelling is unnecessary. This means that the aqueous solution produced on partial hydrolysis of the starting starch can, after the hydrolysis has been terminated, for example by neutralization of the catalytic acid and cooling, be further used directly for the aqueous emulsion polymerization. Prior isolation, for example by spray drying, of the sugared starch is unnecessary.

Suitable free-radical polymerization initiators are all those which are capable of initiating a free-radical aqueous emulsion polymerization. These may be either peroxides, for example alkali metal peroxydisulfates or $H_2O_2$, or azo compounds.

Also suitable are combined systems comprising at least one organic reducing agent and at least one peroxide and/or hydroperoxide, eg. tert-butyl hydroperoxide and the sodium metal salt of hydroxymethanesulfinic acid or hydrogen peroxide and ascorbic acid. Also suitable are combined systems additionally containing a small amount of a metal compound which is soluble in the polymerization medium and whose metallic component can exist in more than one oxidation state, eg. ascorbic acid/iron(II) sulfate/hydrogen peroxide, where ascorbic acid is also frequently replaced by the sodium metal salt of hydroxymethanesulfinic acid, sodium sulfite, sodium hydrogen sulfite or sodium metal bisulfite and hydrogen peroxide is frequently replaced by tert-butyl hydroperoxide or alkali metal peroxydisulfates and/or ammonium peroxydisulfates. In the combined systems, it is furthermore expedient to use the sugared starches as the reducing component. In general, the amount of free-radical initiator systems employed is from 0.1 to 2% by weight, based on the total amount of the monomers to be polymerized. Particularly preferred initiators are ammonium and/or alkali metal peroxydisulfates, alone or as a constituent of combined systems. Particular preference is given to sodium peroxydisulfates.

The manner in which the free-radical initiator system is added to the polymerization reactor during the free-radical aqueous emulsion polymerization according to the invention is of somewhat secondary importance. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In a preferred procedure, some is introduced at the beginning and the remainder is added to the polymerization zone as it is consumed.

It is of course also possible to carry out the free-radical aqueous emulsion polymerization according to the invention under superatmospheric or reduced pressure.

The aqueous polymer dispersions according to the invention are generally prepared with total solids contents of from 15 to 65% by weight, particular preference being given for applicational reasons to those which contain from 10 to 75% by weight, very particularly preferably from 20 to 60% by weight, based on the polymerized monomers, of added sugared starches according to the invention.

The aqueous polymer dispersions according to the invention are extremely versatile. They are particularly suitable as adhesives, as binders for carpet backings, as binders for paper coatings, as additives in mineral, eg. hydraulically setting, binders, as fiber sizes, as binders for finely divided mineral and/or organic materials for the production of moldings (eg. chipboard), in particular for metal casting, or paints and plasters, as thickeners and as binders for the production of abrasives based on finely divided abrasive particles bonded to one another and/or to a support. Particularly advantageous here is the increased film-formation capacity of the aqueous polymer dispersions according to the invention and the increased tear strength (in particular at elevated temperature) of the resultant films. These properties mean that the aqueous polymer dispersions according to the invention are also suitable for the production of coatings, in particular for covering and or embedding pharmaceutical active ingredients to be administered orally.

A further notable property of the aqueous polymer dispersions according to the invention is that they can generally be converted, in a manner known per se, to redispersible polymer powders (for example by spray drying or roll drying or suction-filter drying). In general, it is not necessary in this respect, even in the case of soft polymers (glass transition temperature below 30° C.), to use known aids, such as spraying aids (for example polyvinyl alcohols or finely divided silicates), in particular if the content of sugared starches to be used according to the invention in the aqueous polymer dispersions according to the invention is greater than 10% by weight, based on the amount of polymerized monomers.

It is of course possible to use known drying aids. The redispersibility of the powders is generally retained even on extended storage. It is of particular interest that the powders are generally still redispersible even if no monomers containing ionic groups have been copolymerized. It should again be particularly emphasized that the aqueous polymer dispersions according to the invention have increased flowability, even at high solids contents, and a long shelf life.

Aqueous polymer dispersions according to the invention which can be used in an advantageous manner with particular applicational versatility are those whose polymers are obtainable by free-radical polymerization of monomer mixtures which have the following monomer composition, comprising from 39 to 69% by weight of at least one ester of α,β-monoethylenically unsaturated mono- and dicarboxylic acid having 3 to 6 carbon atoms with alkanols having 1 to 6 carbon atoms (monomer a), from 30 to 60% by weight of styrene (monomer b), from 1 to 10% by weight of at least one monomer from the group comprising α,β-monoethylenically unsaturated carboxylic acids having 3 to 6 carbon atoms, and amides and nitriles thereof, (monomer c) and from 0 to 10% by weight of one or more monomers from the group comprising N-alkylolamides of α,β-monoethylenically unsaturated carboxylic acids having 3 to 6 carbon atoms, with 1 to 4 carbon atoms in the alkyl group, and monomers having up to 25 carbon atoms and containing two non-conjugated, ethylenically unsaturated double bonds (monomer d), and which contain, based on the polymerized monomers, from 1 to 120% by weight, preferably from 10 to 65% by weight, particularly preferably 35 to 55% by weight, of at least one added sugared starch to be used according to the invention. Their total solids content is preferably from 40 to 60% by weight.

It is of course possible to add assistants known per se for the particular application, for example film-forming assistants or fillers, to the aqueous polymer dispersions according to the invention. Correspondingly, the internal strength of the abovementioned preferred aqueous polymer dispersions can be varied by replacing some or all of the monomers d) by other crosslinking monomers mentioned in this publication.

These aqueous polymer dispersions according to the invention, obtainable by free-radical aqueous emulsion polymerization of monomer mixtures comprising monomers a, b, c and, if desired, d are particularly suitable as binders for foundry sands for the production of cores and molds for metal casting, for the production of ingot mold insulating board based on finely divided paper and, if desired, finely divided mineral materials, and for the production of abrasives based on finely divided abrasive particles bonded to one another and/or to a support by means of a binder. Suitable foundry sand generally comprises granular quartz sand, but in certain cases also chromite, zirconium or olivine sand. Fireclay, magnesite, sillimanite or corundum materials are also used. The mean particle diameter (maximum diameter) is normally from 0.05 to 0.6 mm. Conversion of the foundry sands to foundry moldings is generally carried out by mixing the sands with the aqueous polymer dispersions according to the invention while establishing the desired binder content, in general (calculated in dry form) from 0.1 to 10% by weight, preferably from 0.1 to 5% by weight, based on the amount of foundry sand, transferring the mixture (referred to here as mortar) into a mold (negative), if desired compacting the material by exerting pressure, and subsequently curing the material. It is noteworthy that, on use of the aqueous polymer dispersions according to the invention, which are usually used for this purpose with a total solids content of from 40 to 60% by weight, the curing process does not necessarily require the use of elevated temperatures (normally from 50° to 250° C.), but thorough curing also takes place at a satisfactory rate when left to itself at room temperature. The curing can also be achieved in an applicationally particularly elegant manner by exposing the material to be cured to the action of microwaves. In this respect, aqueous polymer dispersions according to the invention which are obtainable by free-radical aqueous emulsion polymerization of mixtures of monomers a, b, c and d whose monomer composition is selected so that a polymer built up only from monomers a, b and c would have a glass transition temperature in the range from 0° to 40° C., are recommended with particular advantage.

According to Fox (T. G. Fox, Bull. Am. Phys. Soc. (Ser. II) 1 (1956) 123), the glass transition temperature of copolymers is given, to a close approximation, by:

$$\frac{1}{Tg} = \frac{X^1}{Tg^1} + \frac{X^2}{Tg^2} + \ldots \frac{X^s}{Tg^s}$$

where $X^1, X^2, \ldots, X^s$ denote the proportions by weight of monomers $1, 2, \ldots, s$, and $Tg^1, Tg^2, \ldots, Tg^s$ denotes the glass transition temperatures of the respective polymers built up only from one of the monomers $1, 2, \ldots, s$, in Kelvin. The glass transition temperatures of the monomers a, b and c are essentially known and are listed, for example, in J. Brandrup, E. H. Immergut, Polymer Handbook, 1st Edn., J. Wiley, New York 1966, and 2nd Edn., J. Wiley, New York 1975.

A further advantage of the use of the aqueous polymer dispersion according to the invention is that the cured molding has increased flexural strength, in particular at elevated temperature. This ensures increased dimensional stability in the presence of hot molten metal. Furthermore, the negative mold is simple to clean with water after removal of the molding, and the molding itself can, if required, be converted back into uncured mortar by adding water (redispersibility), which is equivalent to an infinitely long processability of the mortar. If the polymers also contain incorporated monomers d, particularly high flexural strengths result. In addition, the flexural strengths can be further increased by adding up to 20% by weight, based on the solids content of the aqueous polymer dispersions determined without the sugared starch, of saturated dialdehydes, preferably those of the formula I

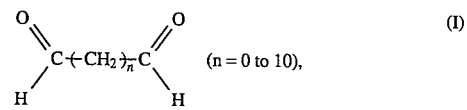

before the aqueous polymer dispersions to be used according to the invention are used, dialdehydes of the formula I where n=0 to 2 being preferred. Other suitable additives for increasing the flexural strengths are condensation products based on formaldehyde, melamin, phenol and/or urea, eg. Urecoll® 118. The amount to be used can be up to 250% by weight, based on the solids content of the aqueous polymer dispersions according to the invention determined without the sugared starch.

However, the last-mentioned additives only have an advantageous effect in the manner described if the curing is carried out at elevated temperature, in general from 100° to 250° C., or in the presence of acid. The latter can be achieved in a simple manner by adjusting the pH of the dispersion medium of the aqueous polymer dispersions to be used according to the invention to from 1 to 5, preferably to from 2 to 3. If flexural strengths within usual limits are required, it is preferred to use no additives. The moldings obtainable have, as further properties:
good resistance to erosion by molten metal
smooth and closed surfaces of the casting
good release after casting
minimal subsequent cleaning for the castings
minimal evolution of toxic gases during casting.

The polymer dispersions according to the invention, which are particularly suitable for the production of foundry moldings, are, in the same way, particularly suitable for the production of abrasives based on finely divided abrasive particles which are bonded to one another and/or to a support by means of a binder. Particularly suitable finely divided abrasive particles are fused or sintered corundum, zirconium corundum, silicon carbide and emery. Suitable support materials include flexible substrates, eg. paper, vulcanized fiber, woven fabrics, knitted fabrics, nonwovens based on natural and/or synthetic fibers, plastic films or metal foils. In general, abrasives of this type are produced by first applying to the support a so-called make coat, into which, in the wet state, the abrasive particles are embedded. After a first fixing of the abrasive particles by drying (curing), a second, so-called size coat is generally applied in order to improve the embedding and reinforce the particles. In principle, the make coat and size coat can comprise different binders. According to the invention, at least one of the two, preferably the size coat and particularly preferably both, comprise the aqueous polymer dispersions according to the invention. Typical requirements made of binders suitable for the production of abrasives are:
good adhesion, both to the substrate and to the abrasive particles,
curable rapidly under gentle conditions,
very low loading of the support material,
high heat distortion resistance,
increased flowability on application and
good mechanical properties during grinding (formation of hard, tough films).

These requirements are achieved entirely satisfactorily by the aqueous polymer dispersions according to the invention. Thus, curing when they are used does not necessarily require elevated temperatures, but can be carried out at room temperature and particularly advantageously under the action of microwaves. This is particularly gentle for the support material and avoids extreme removal of water, making complex regeneration of the carrier material in climatic zones unnecessary.

Their favorable flow behavior proves to be particularly advantageous if the aqueous polymer dispersions according to the invention are used as a size coat, since it enables the binder to penetrate into the interstices between the abrasive particles.

In addition, the binders according to the invention are distinguished, in particular, by increased heat distortion resistance, so that the abrasive particles remain fixed in their position even at the elevated temperatures (150° C. or more) which occur during grinding. Loosening of the abrasive particles (which reduces the abrasive effect) or even dislodgement is thus suppressed. The make coat is usually applied in a dry film thickness of from 10 to 100 μm and the size coat in a dry film thickness of from 20 to $10^3$ μm.

When employed as binders for paper coating compositions, the aqueous polymer dispersions according to the invention give paper increased wet and dry pick resistance.

In the examples below, the sugared starches used were the C* PUR products 01906, 01908, 01910, 01915, 01921, 01924, 01932 and 01934 from Cerestar Deutschland GmbH, D-1150 Krefeld 12. Essentially all have a bimodal molecular weight distribution and are characterized as follows:

| Type | $M_w$ | U | % by wt. <1000 | DE | $\eta^{40}$ [Pa·s] |
|------|-------|-----|-------|-------|-------|
| 01906 | 20080 | 10.9 | 12.2 | 2–5 | — |
| 01908 | 19290 | 10.0 | 15.9 | 8–10 | 0.056 |
| 01910 | 10540–12640 | 8.5–9.9 | 24.7–26.4 | 11–14 | 0.030 |
| 01915 | 6680–8350 | 6.8–8.4 | 32.9–34.7 | 17–19 | 0.021 |
| 01921 | 6700 | 7.4 | 39.1 | 20–23 | 0.017 |
| 01924 | 4730 | 6.8 | 53.6 | 26–30 | 0.014 |
| 01932 | 4500 | 7.9 | 63.2 | 33–35 | 0.011 |
| 01934 | 3000 | 6.0 | 68.4 | 36–39 | 0.009 |

Determination of $M_n$ by means of vapor pressure osmometry gave the following values for the preferred types 01910 and 01915:

1560 g/mol (1910)

980 g/mol (1915)

EXAMPLES

Example 1

Aqueous polymer dispersions DX according to the invention (the data in % by weight are always based on the amount of polymerized monomers, unless stated otherwise)

D1 to D10: General Preparation Procedure

A mixture comprising 513 g of water 120 g of sugared starch (20% by weight)

60 g of feed 1 and 39 g of feed 2 was heated at 85° C. and kept at this temperature for 15 minutes. The remainder of feeds 1 and 2 were subsequently fed continuously to the polymerization zone beginning at the same time (feed 1 over the course of 2.5 hours, feed 2 over the course of 3 hours) while maintaining the temperature of 85° C. The mixture was subsequently polymerized for a further hour (85° C.) and then cooled to room temperature.

Feed 1:

330 g of n-butyl acrylate (55% by weight)

258 g of styrene (43% by weight)

12 g of acrylic acid (2% by weight)

Feed 2:

4.8 g of sodium peroxydisulfate (0.8% by weight) in 190 g of water

The same free-radical aqueous emulsion polymerization was repeated, but the initial mixture contained 300 g of sugared starch dissolved in 710 g of water. Aqueous polymer dispersions were obtained whose total solids content was essentially 50% by weight and which essentially contained no flocculations. The Brookfield viscosity [BV (mPa.s)] of these polymer dispersions was determined at 25° C. by means of a Brookfield RVT viscometer every 3 months, in each case at 20 and 100 revolutions per minute, and the light transparency (LT) was also determined. The data for the light transparency are based on a 0.1% strength by weight aqueous polymer dispersion and a cell thickness of 25 mm. The measurement was carried out using a commercially available photometer relative to water, which was randomly assigned an LT of 100. The LT is a measure of the mean particle size. The results obtained are shown in Table 1.

TABLE 1

| | Type and % by wt. of sugared starch | BV(20) BV(100) in each case immediately | | BV(20) BV(100) after 3 months | | LT |
|---|---|---|---|---|---|---|
| D1 | 01915/20 | 140 | 106 | 130 | 100 | 45 |
| D2 | 01921/20 | 52 | 67 | 50 | 63 | 32 |
| D3 | 01924/20 | 40 | 57 | 40 | 56 | 29 |
| D4 | 01932/20 | 32 | 50 | 32 | 50 | 24 |
| D5 | 01934/20 | 29 | 48 | 30 | 46 | 20 |
| D6 | 01915/50 | 192 | 151 | 170 | 140 | 71 |
| D7 | 01921/50 | 54 | 83 | 60 | 80 | 58 |
| D8 | 01924/50 | 48 | 74 | 42 | 72 | 55 |
| D9 | 01932/50 | 32 | 54 | 30 | 52 | 42 |
| D10 | 01934/50 | 27 | 48 | 25 | 47 | 37 |

D11 to D13

D11: A mixture comprising 200 g of water 25 g of sugared starch 01910 (5% by weight)

71 g of feed 1 and 10 g of feed 2 was heated to 85° C. and kept at this temperature for 15 minutes. The remainder of feeds 1 and 2 were subsequently fed continuously to the polymerization zone commencing at the same time (feed 1 over the course of 2.5 hours, feed 2 over the course of 3 hours), while maintaining the temperature of 85° C. The mixture was then polymerized for a further hour (85° C.) and cooled to room temperature. The total solids content of the resultant aqueous polymer dispersion, which was essentially free from flocculation, was essentially 50% by weight.

Feed 1:

450 g of n-butyl acrylate (90% by weight)

40 g of styrene (8% by weight)

10 g of acrylic acid (2% by weight)

pre-emulsified in 204 g of water by means of 1.5 g (0.3% by weight) of sodium salt of dodecylbenzenesulfonic acid.

Feed 2:
2.5 g of sodium peroxydisulfate dissolved in 100 g of water (0.5% by weight).

D12 and D13:
At the total solids content corresponding to D11, the monomer mixtures D12:
55% by weight of n-butyl acrylate
43% by weight of styrene
2% by weight of acrylic acid and D13:
50% by weight of n-butyl acrylate
45% by weight of styrene
5% by weight of acrylic acid were polymerized in a corresponding manner. However, the proportion of sugared starch 01910 was 20% by weight (D12) or 40% by weight (D13), and the sodium salt of dodecylbenzenesulfonic acid was in both cases used in a proportion of 0.1% by weight.

The BV and LT valves of the resultant aqueous polymer dispersions, which in all cases contained essentially no flocculations, are shown in Table 2.

TABLE 2

| | BV(20) BV(100) in each case immediately | | Months thereafter | BV(20) | BV(100) |
|---|---|---|---|---|---|
| D11 | 63 | 69 | 8 | 50 | 63 |
| D12 | 88 | 91 | 10 | 75 | 88 |
| D13 | 132 | 122 | 3 | 124 | 117 |

D14

A mixture comprising
394 g of water
300 g of sugared starch 01915 (100% by weight)
40 g of feed 1 and
40 g of feed 2 was heated at 85° C. and kept at this temperature for 15 minutes. The remainder of feeds 1 and 2 was subsequently fed continuously to the polymerization zone commencing at the same time (feed 1 over the course of 2.5 hours, feed 2 over the course of 3 hours), while maintaining the temperature of 85° C. The mixture was subsequently polymerized for a further hour (85° C.) and cooled to room temperature. The solids content of the resultant dispersion was 50.6% by weight; there were essentially no flocculations.

Feed 1:
294 g of styrene (98% by weight)
6 g of methacrylic acid (2% by weight)
pre-emulsified in 101 g of water by means of 2 g of a 15% strength by weight aqueous solution of the sodium salt of dodecylbenzenesulfonic acid (0.1% by weight).

Feed 2:
2.4 g of sodium peroxydisulfate dissolved in 100 g of water (0.8% by weight).

Determination of the Brookfield viscosities and LT gave the following results:

| BV(20) | BV(100) immediately | BV(20) | BV(100) after 3 months | LT |
|---|---|---|---|---|
| 76 | 98 | 70 | 112 | 39 |

D15

A mixture comprising
549 g of water
199.6 g of sugared starch 01910 (100% by weight)
24 g of feed 1 and
30 g of feed 2 was treated at 85° C. and kept at this temperature for 15 minutes. The remainder of feeds 1 and 2 was subsequently fed continuously to the polymerization zone commencing at the same time (feed 1 over the course of 2 hours, feed 2 over the course of 2.5 hours), while maintaining the temperature of 85° C. The mixture was subsequently polymerized for a further hour (85° C.) and cooled to room temperature. The solids content of the aqueous polymer dispersions, which was essentially free from flocculations, was 29.4% by weight.

Feed 1:
196 g of styrene (98% by weight)
4 g of methacrylic acid (2% by weight)
pre-emulsified in 271 g of water by means of 6.7 g of a 15% strength by weight aqueous solution of the sodium salt of dodecylbenzenesulfonic acid (0.5% by weight).

Feed 2:
1.6 g of sodium peroxydisulfate in 100 g of water (0.8% by weight).

The BV values were determined as follows:

| BV(20) | BV(100) immediately | BV(20) | BV(100) after 3 months |
|---|---|---|---|
| 17 | 32 | 17 | 30 |

D16 to D18

D16:
A mixture comprising
203 g of water
6 g of sugared starch 01910 (1% by weight)
81 g of feed 1 and
39 g o f feed 2 was heated to 90° C. and kept at this temperature for 30 minutes. The remainder of feeds 1 and 2 was subsequently fed continuously to the polymerization zone commencing at the same time (feed 1 over the course of 2.5 hours, feed 2 over the course of 3 hours), while maintaining the temperature of 90° C. The mixture was subsequently polymerized for a further hour (90° C.) and cooled to room temperature.

Feed 1:
330 g of n-butyl acrylate (55% by weight)
258 g of styrene (43% by weight)
12 g of acrylic acid (2% by weight)
pre-emulsified in 202 g of water by means of 4 g of a 15% strength by weight aqueous solution of the sodium salt of dodecylbenzenesulfonic acid (0.1% by weight).

Feed 2:
4.8 g of sodium peroxydisulfate in 190 g of water (0.8% by weight).

D17 and D18
As for D16, but, instead of 203 g of water/6 g of 01910, the initial mixture contained 214 g of water/18 g of 01910 (3% by weight, D17) or 225 g of water/30 g of 01910 (5% by weight, D18).

The BV and LT values of the resulting aqueous polymer dispersions, which in all cases contain essentially no flocculations, are shown in Table 3. The solids content was essentially 50% by weight in all cases.

TABLE 3

| | BV(20) | BV(100) | BV(20) | BV(100) | LT | d̄ [nm] |
| | immediately | | after 11 months | | | |
|---|---|---|---|---|---|---|
| D16 | 30 | 49 | 25 | 42 | 13 | 407 |
| D17 | 40 | 59 | 33 | 50 | 25 | 310 |
| D18 | 92 | 92 | 62 | 76 | 51 | 209 | d̄ is the mean particle diameter and was determined by means of a photon correlation spectrometer (Malvem Autosizer 2C).

D19

A mixture comprising 549 g of water 120 g of sugared starch 01910 (20% by weight)

2 g of a 15% strength by weight aqueous solution of the sodium salt of laurylsulfonic acid (0.05% by weight)

60 g of feed 1 and 31 g of feed 2 was heated to 95° C. and kept at this temperature for 15 minutes. The remainder of feeds 1 and 2 was subsequently fed continuously to the polymerization zone commencing at the same time (feed 1 over the course of 2.5 hours, feed 2 over the course of 3 hours), while maintaining the temperature of 95° C. The mixture was subsequently polymerized for a further hour (85° C.) and cooled to room temperature. An aqueous polymer dispersion was obtained which contained essentially no flocculations and whose solids content was 50% by weight.

Feed 1:

480 g of ethyl acrylate (68% by weight)

192 g of methyl methacrylate (32% by weight)

Feed 2:

1.8 g of sodium peroxydisulfate in 100 g of water (0.3% by weight)

| BV(20) | BV(100) | BV(20) | BV(100) | LT |
| immediately | | after 4 months | | |
|---|---|---|---|---|
| 64 | 86 | 53 | 78 | 58 |

D20 [D21]

A mixture comprising 206 g [227 g] of water 50 g [100 g] of sugared starch 01910 (10% by weight [20% by weight])

16.7 g of a 30% strength by weight aqueous hydrogen peroxide solution

[16.7 g of a 15% strength by weight aqueous solution of the sodium salt of laurylsulfonic acid]

47 g of feed 1 was warmed to 50° C., and 15 g of feed 2 were added. The reaction mixture was subsequently warmed to 70° c and kept at this temperature for 15 minutes. The remainder of feeds 1 and 2 was subsequently fed continuously to the polymerization zone commencing at the same time (feed 1 over the course of 2.5 hours, feed 2 over the course of 3 hours), while maintaining the temperature of 70° C. The mixture was subsequently polymerized for a further 30 minutes (70° C.) and cooled to room temperature.

Feed 1:

270 g of ethyl acrylate (54% by weight)

230 g of methacrylic acid (46% by weight)

33.3 [16.7 g] of a 15% strength by weight aqueous solution of the sodium salt laurylsulfonic acid (0.1% by weight [0.05% by weight])

413 g of water

Feed 2:

3 g of ascorbic acid and 0.05 g of Mohr's salt (=(NH$_4$)$_2$Fe(SO$_4$)$_2$.6H$_2$O) in 150 g of water.

About 40% strength by weight aqueous polymer dispersions were obtained which were essentially free from flocculations. The BV and LT values were determined as follows:

| | BV(20) | BV(100) | LT |
| | after 4 months | | |
|---|---|---|---|
| D20 | 18 | 33 | 33 |
| D21 | 27 | 48 | 61 |

D22

A mixture of 1,443.2 g of water 2,500 g of a 20% strength by weight aqueous solution of sugared starch 01915 (25% by weight)

0.06 g of FeSO$_4$.7H$_2$O 3.33 g of a 60% strength by weight aqueous solution of the sodium salt of di-2-ethylhexyl sulfosuccinate (0.1% by weight)

328.6 ml of feed 1 and 80 ml of feed 2 was heated to 85° C., and the reaction mixture was kept at this temperature for 15 minutes. The remainder of feeds 1 and 2 was subsequently fed continuously to the reaction zone commencing at the same time (feed 1 over the course of 3 hours, feed 2 over the course of 4 hours), while maintaining the temperature of 85° C. The mixture was subsequently polymerized for a further 3 hours (85°) and cooled to room temperature. An aqueous polymer dispersion was obtained which was essentially free from flocculations and had a total solids content of 41% by weight.

Feed 1:

2000 g of butadiene (3.23 l) (100% by weight)

60 g of tert-dodecyl mercaptan (3% by weight)

Feed 2:

24 g of sodium peroxydisulfate in 376 g of water (1.2% by weight)

The BV and LT values were determined as follows:

| BV(20) | BV(100) | LT |
| after 3 months | | |
|---|---|---|
| 22 | 42 | 59 |

D23

A mixture of 247 g of water 90 g of sugared starch 01910 (20% by weight)

63 g of feed 1 and 37 g of feed 2 was heated to 80° C. and kept at this temperature for 15 minutes. The remainder of feeds 1 and 2 was subsequently fed continuously to the reaction zone commencing at the same time (feed 1 over the course of 2.5 hours, feed 2 over the course of 3 hours), while maintaining the temperature of 80° C. The mixture was subsequently polymerized for a further hour (80° C.) and cooled to room temperature. An aqueous polymer dispersion was obtained which was essentially free from flocculations and had a total solids content of 50.2% by weight.

Feed 1:

247.5 g of n-butyl acrylate (55% by weight)

193.5 g of styrene (43% by weight)

9 g of acrylic acid (2 % by weight)

pre-emulsified in 173 g of water by means of 4.5 g of a 20% strength by weight aqueous solution of a mixture of ethoxylated fatty alcohols (degree of ethoxylation 18, $C_{16/18}$) (0.2 % by weight)

Feed 2:

2.25 g of sodium peroxydisulfate (0.5% by weight) in 90 g of water

The BV values were determined as follows:

| BV(20) | BV(100) | BV(20) | BV(100) |
|--------|---------|--------|---------|
| immediately | | after 1 year | |
| 188 | 121 | 140 | 106 |

Example 2

Applications of Aqueous Polymer Dispersions According to the Invention

A1: Binder for a Paper Coating Composition

A 60% strength by weight paper coating composition which, apart from water, had the following composition:

80 g of china clay 5PS (kaolin)

20 g of Omyalite 90 (chalk)

0.2 g of Polysalz®S (low-molecular-weight polyacrylic acid, dispersant for kaolin and chalk)

11.5 g of aqueous polymer dispersion D23 according to the invention from Example 1 (calculated in dry form)

0.3 g of Sterocoll®D (calculated in dry form) (aqueous dispersion of an acrylate polymer with a high acrylic acid content, thickener) and 0.6 g of Blankophor® PSG-fl. (optical brightener)

was coated onto untreated paper (supplied by Scheufelen, Oberlennigen, Germany) having a basis weight of 70 g/m². The application rate was 12 g/m² (dry). The coating was subsequently dried at 120° C. for 5 minutes and then conditioned at 23° C. and 50% relative atmospheric humidity for 8 hours. The coated paper was then glazed in a roll press under a linear pressure of 125 kp/cm, and briefly conditioned again, and the coating properties were then determined. To this end, the dry pick resistance DPR (data for the critical pick rate; high rates correspond to high dry pick resistances) and the wet pick resistance WPR (data for the resultant color density in %; high values correspond to high wet pick resistances) were determined using a commercially available IGT apparatus. Furthermore, the print gloss PG was determined using a Lehmann tester at an angle of 45°. For comparison, the procedure was repeated using a paper coating composition in which the 11.5 g of D23 (calculated in dry form) was replaced by 11.5 g of a polymer dispersion (Acronal®S 320D, calculated in dry form) commercially available for this purpose and stabilized by means of an emulsifier. The results obtained are shown in Table 4.

TABLE 4

| | TR (cm/s) | NR (%) | DG (%) |
|---|---|---|---|
| D23 | 64 | 10.6 | 8.5 |
| Acronal S 320D | 46 | 30.6 | 28 |

A2: Spray Drying for the Preparation of Powders

Aqueous polymer dispersion D13 from Example 1 was spray-dried by means of a spray drier (Niro Minor) without the addition of further assistants.

Inlet temperature: 130° C.

Outlet temperature: 80° C.

A white polymer powder which was redispersible in an entirely satisfactory manner was obtained.

A3: Aluminum Paper Lamination 70 g of water and, as thickener, 3 g of Collacral®HP (30% strength by weight aqueous solution of a copolymer based on acrylic acid and acrylamide emulsified in an aliphatic crude oil fraction) were stirred into 50 g of aqueous polymer dispersion D13 from Example 1 after removal of the residual monomers. 2 g/m² (dry) of this lamination adhesive K1 were applied to the matt side of a 0.0095 mm thick aluminum foil matt on one side. Buxine paper (80 g/m²) was rolled onto the wet adhesive bed, and the resultant substrate was dried at 50° C. for 3 minutes. The paper was subsequently cut to a format of 20 cm×20 cm, and this section was subjected to a pressure of 100 bar at 90° C. for 3 minutes. The laminate was subsequently subjected to the following tests:

1) Adhesion test

The adhesion of the Buxine paper after storage for 30 minutes in cold water (20° C.) and after storage for 5 minutes in hot water (100° C.) was tested by hand. The assessment was carried out by scores 1 to 5.

1=paper tears over the entire area

2=paper tears over part of the area

3=good adhesion with adhesive failure in the foil or paper

4=weak adhesion with adhesive failure in the foil or paper

5=no adhesion.

Heat-sealing resistance:

The sections were subjected with the aluminum side up to a temperature rising from 180° C. to 250° C. in a heat-sealing unit at 0.25 second intervals under a pressure of 2.5 bar, the temperature rising in 10° C. steps. The test was terminated when bubble formation was clearly visible. The heat-sealing resistance is important for sealing on plastic films.

Odor test:

Sections measuring 9 cm×18 cm were subjected to a temperature of 110° C. for 15 seconds and then sealed in 370 ml bottles and stored at 50° C. for 2 hours. The bottles were subsequently opened and tested for odor.

1=no odor

2=weak odor

3=odor

4=strong odor

The experiment series was repeated with a lamination adhesive K2 which, in contrast to K1, additionally contained 3.1 g of a 40% strength by weight aqueous solution of glyoxal. The results are shown in Table 5.

TABLE 5

|  | K1 | K2 |
|---|---|---|
| Adhesion cold | 1 | 1 |
| Adhesion hot | 1 | 1 |
| Heat-sealing resistance | up to 210° C. | up to 240° C. |
| Odor | 2 | 2 |

A4: Abrasive Articles Based on Finely Divided Abrasive Particles Bonded to a Support by Means of an Aqueous Polymer Dispersion According to the Invention 100 g of various aqueous polymer dispersions according to the invention from Example 1, to some of which 0.062 part by weight of glyoxal had been added per part by weight of sugared starch present, were mixed with 1 g of Lumiten® (wetting agent) and applied to a support paper at an application rate of 20 g/m² (dry). Semiprecious corundum 60 was scattered into the wet coating, and the paper coated in this way was dried at 90° C. for 3 minutes. The same binder was subsequently applied as a size coat at an application rate of 60 g/m² (dry) and likewise dried (30 minutes). The resultant abrasive paper was tested by means of an APG 100/20 abrasion tester (Maag & Schank, Gomaringen). The test specimens used were specimens measuring 40 mm×20 mm×5 mm made from rigid PVC. In the test, an area of 20 mm×5 mm was rubbed off by 500 strokes (load 1 kg), with the abrasive paper being moved to and fro beneath the test specimen for a length of 10.5 cm. A measure of the quality of the binder is the abrasion, which is defined as follows:

$$\text{Abrasion}[\%] = \frac{\text{Weight of test specimen before testing} - \text{Weight of test specimen after testing}}{\text{Weight of test specimen before testing}} \times 100$$

The results are shown in Table 6.

TABLE 6

| Binder | Glyoxal | Drying temperature (°C.) top layer | Abrasion (%) |
|---|---|---|---|
| D13 | – | 90 | 8.7 |
| D13 | + | 90 | 10.7 |
| D24* | + | 150 | 7 |
| D25* | + | 150 | 7.5 |

*D24 and D25 prepared as for D13, but with a different monomer composition:

D24

50% by weight of n-butyl acrylate,
45% by weight of styrene
5% by weight of methacrylic acid

D25

50% by weight of n-butyl acrylate,
40% by weight of styrene
10% by weight of acrylic acid.

A5: Foundry Moldings Containing Binders According to the Invention 1000 g of quartz sand H 33 were mixed with various amounts (indicated in Table 7 in % by weight based on sand, calculated in dry form) of aqueous polymer dispersions according to the invention having a total solids content of 50% by weight, to some of which 0.125 part by weight of glyoxal or 1.075 parts by weight of Urecoll 118 had been added per part by weight of sugared starch present. The mixture was subsequently introduced into a mold and compacted three times by means of a ram (G. Fischer AG, Schaffhausen, Switzerland) having a weight of 6.7 kg from a full height of 5 cm. The resultant moldings (Fischer bars) had the following dimensions, with rounded ends:

length about 173 mm width about 22 mm height about 22 mm

The bars were then dried under various conditions, and the core flexural strength was subsequently determined at room temperature using a tester from G. Fischer AG (Schaffhausen, Switzerland).

The preparation of the novel aqueous polymer dispersions used corresponded to D12 from Example 1, but in some cases with a different monomer composition and, based on the monomers, different amounts of sugared starch. Details and results are shown in Table 7.

The following abbreviations were used for the monomers:

BA=n-butyl acrylate

St=styrene

AA=acrylic acid

MAmol=n-methylolmethacrylamide

BDA=butanediol diacrylate

DVB=divinylbenzene

TABLE 7

| Monomer composition (% by weight) | % by weight of starch | Amount of binder | Glyoxal | Urecoll | Drying time | Temperature (°C.) | Core flexual strength (N/mm²) |
|---|---|---|---|---|---|---|---|
| 55 BA 43 St 2 AA | 40 | 1 | – | – | 10 min | 150 | 1.8 |
| 55 BA 43 St 2 AA | 40 | 2 | – | – | 10 min | 150 | 4.9 |
| 55 BA 43 St 2 AA | 40 | 3 | – | – | 10 min | 150 | 6.0 |
| 55 BA 43 St 2 AA | 40 | 3 | – | – | 30 min | 150 | 5.8 |
| 55 BA 43 St 2 AA | 40 | 3 | + | – | 30 min | 150 | 6.2 |
| 55 BA 43 St 2 AA | 50 | 2 | – | – | 10 min | 150 | 4.9 |
| 45 BA 53 St 2 AA | 40 | 2 | – | – | 10 min | 150 | 6.2 |
| 65 BA 33 St 2 AA | 40 | 2 | – | – | 10 min | 150 | 3.8 |
| 52 BA 41 St 2 AA 5 MAmol | 50 | 2 | – | – | 10 min | 150 | 4.5 |
| 55 BA 42.5 St 2 AA 0.5 BDA | 50 | 2 | – | – | 10 min | 150 | 5.2 |
| 54 BA 42 St 2 AA 2 DVB | 50 | 2 | – | – | 10 min | 150 | 5.0 |
| 50 BA 45 St 5 Ah | 40 | 2 | – | – | 10 min | 150 | 5.2 |
| 50 BA 45 St 5 AA | 40 | 2 | – | + | 10 min | 150 | 7.9 |
| 45 BA 53 St 2 AA | 40 | 2 | – | + | 10 min | 150 | 8.7 |
| 45 BA 53 St 2 AA | 40 | 2 | – | + | 10 min | 150 | 2, 6 (at 200° C.) |

TABLE 7-continued

| Monomer composition (% by weight) | % by weight of starch | Amount of binder | Glyoxal | Urecoll | Drying time | Temperature (°C.) | Core flexual strength (N/mm²) |
|---|---|---|---|---|---|---|---|
| 55 BA 42.5 St 2 AA 0.5 DVB | 50 | 2 | – | – | 3 min | Microwave 1300W | 5.0 |
| 50 BA 45 St 5 AA | 40 | 2 | – | – | 4 h | 25 | 2.5 |
| 50 BA 45 St 5 AA | 40 | 2 | – | – | 6 h | 25 | 5.1 |

We claim:

1. A polymer powder obtained by drying an aqueous polymer dispersion, wherein said aqueous polymer dispersion is obtained by free-radical polymerization of unsaturated monomers and contains at least one added starch-degradation product which is obtained by a process consisting of acid hydrolysis of a native starch in the aqueous phase, wherein the starch degradation product is water soluble at room temperature and has a weight average molecular weight $M_w$ of from 2500 to 25000.

2. The polymer powder as claimed in claim 1, wherein said at least one added starch-degradation product has an aqueous solubility of at least 40% by weight at room temperature.

3. The polymer powder as claimed in claim 1, wherein said at least one added starch-degradation product has an aqueous solubility of over 50% by weight at room temperature.

4. The polymer powder of claim 1, wherein said free-radical polymerization is carried out in the presence of said starch-degradation product and by the method of free-radical aqueous emulsion polymerization.

5. The polymer powder as claimed in claim 4, wherein said at least one added starch-degradation product has an aqueous solubility of at least 40% by weight at room temperature.

6. The polymer powder as claimed in claim 4, wherein said at least one added starch-degradation product has an aqueous solubility of over 50% by weight at room temperature.

7. The polymer powder as claimed in claim 4, wherein said aqueous polymer dispersion is obtained by carrying out the free-radical aqueous emulsion polymerization at a temperature from 75° to 90° C.

8. The polymer powder as claimed in claim 4, wherein said aqueous polymer dispersion is obtained by carrying out the polymerization in the presence, as free-radical polymerization initiator, of an alkali metal peroxydisulfate or ammonium peroxydisulfate or a mixture thereof.

9. The polymer powder as claimed in claim 4, wherein said aqueous polymer dispersion is obtained by carrying out the free-radical aqueous emulsion polymerization by the feed process, in which part of the polymerization batch containing all the starch-degradation product to be used, some of the monomers and some of the initiator system in aqueous solution, is heated to the polymerization temperature and partially polymerized, and the remainder of the polymerization batch is subsequently fed to the polymerization zone while the polymerization is maintained.

10. The polymer powder as claimed in claim 1, wherein the starch-degradation product has an $M_w$ in the range from 4000 to 16000.

11. The polymer powder as claimed in claim 1, wherein the starch-degradation product has a molecular weight distribution whose nonuniformity U is in the range from 6 to 12.

12. The polymer powder as claimed in claim 1, wherein the starch-degradation product has a molecular weight distribution with nonuniformity U of from 7 to 11.

13. The polymer powder as claimed in claim 1, wherein at least 10% by weight, but not more than 70% by weight, of the starch-degradation product has a molecular weight of less than 1000.

14. The polymer powder as claimed in claim 1, wherein the starch-degradation product has a dextrose equivalent DE of from 5 to 40.

15. The polymer powder as claimed in claim 1, wherein the starch-degradation product has a dynamic viscosity $\eta^{40}$ (Pa.s) of from 0.01 to 0.06, determined in accordance with DIN 53019, in 40% strength by weight aqueous solution at 25° C. and a shear gradient of 75 $s^{-1}$.

16. The polymer powder as claimed in claim 1, wherein the starch-degradation product has a bimodal molecular weight distribution.

17. The polymer powder as claimed in claim 1, wherein the starch-degradation product is present in an amount from 10 to 75% by weight, based on the amount of polymerized monomers.

18. The polymer powder as claimed in claim 1, wherein the starch-degradation product is present in an amount of from 20 to 60% by weight, based on the amount of polymerized monomers.

19. The polymer powder as claimed in claim 1, wherein the starch-degradation product has a bimodal molecular weight distribution, a non-uniformity U of 6 to 12, a dextrose equivalent, DE, of from 5 to 40 and a dynamic viscosity, $\eta^{40}$ (Pa.s) of from 0.01 to 0.06, determined in accordance with DIN 53019, in 40% strength by weight aqueous solution at 25° C. and a shear gradient of 75 $s^{-1}$, wherein at least 10%, but not more than 70% of the starch-degradation product has molecular weight below 1000.

20. The polymer powder of claim 1, wherein said aqueous polymer dispersion is obtained by free-radical polymerization of a monomer mixture containing from 39 to 69% by weight of at least one ester of $\alpha,\ominus$-monoethylenically unsaturated mono- and dicarboxylic acids having 3 to 6 carbon atoms with alkanols having 1 to 6 carbon atoms, from 30 to 60% by weight of styrene, from 1 to 10% by weight of at least one monomer selected from the group consisting of $\alpha,\beta$-monoethylenically unsaturated carboxylic acids having 3 to 6 carbon atoms, and amides and nitriles thereof, and from 0 to 10% by weight of crosslinking monomers wherein said monomer mixture contains said at least one added starch-degradation product.

21. The polymer powder of claim 1, wherein said aqueous polymer dispersion is obtained by free-radical polymerization of a monomer mixture containing from 70 to 100% by weight of styrene or butadiene or a mixture thereof, which contains said at least one added starch degradation product.

22. The polymer powder of claim 1, wherein said aqueous polymer dispersion is obtained by free-radical polymerization of a monomer mixture containing from 70 to 100% by weight of vinyl chloride or vinylidene chloride or a mixture thereof, which contains said at least one added starch-degradation product.

23. The polymer powder of claim 1, wherein said aqueous polymer dispersion is obtained by free-radical polymerization of a monomer mixture containing from 90 to 99% by weight of esters of acrylic or methacrylic acid with alkanols having 1 to 8 carbon atoms or styrene or a mixture thereof, and from 1 to 10% by weight of acrylic acid, methacrylic acid or a mixture thereof, wherein said monomer mixture contains said at least one added starch-degradation product.

* * * * *